(12) United States Patent
Wu (10) Patent No.: US 12,281,736 B2
(45) Date of Patent: Apr. 22, 2025

(54) SUPPORT MEMBER AND PIPE MEMBER CONNECTING STRUCTURE

(71) Applicant: Xindiyuan Materials Technology (Shanghai) Co., Ltd., Shanghai (CN)

(72) Inventor: Limin Wu, Shanghai (CN)

(73) Assignee: Xindiyuan Materials Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/277,250

(22) PCT Filed: Sep. 9, 2021

(86) PCT No.: PCT/CN2021/117468
§ 371 (c)(1),
(2) Date: Aug. 15, 2023

(87) PCT Pub. No.: WO2022/179081
PCT Pub. Date: Sep. 1, 2022

(65) Prior Publication Data
US 2024/0125408 A1    Apr. 18, 2024

(30) Foreign Application Priority Data
Feb. 26, 2021 (CN) .......................... 202110217824.4

(51) Int. Cl.
*F16L 3/10*      (2006.01)
*F16B 7/04*      (2006.01)
(Continued)

(52) U.S. Cl.
CPC .......... *F16L 3/1091* (2013.01); *F16B 7/0413* (2013.01); *F16L 21/00* (2013.01);
(Continued)

(58) Field of Classification Search
CPC . F16L 3/1091; F16L 3/10; F16L 21/00; F16L 21/08; F16L 53/30; F16L 59/14;
(Continued)

(56) References Cited

FOREIGN PATENT DOCUMENTS

| CN | 205078956 U | 3/2016 |
| CN | 205986014 U | 2/2017 |

(Continued)

OTHER PUBLICATIONS

Int'l. Search Report from PCT/CN2021/117468, Nov. 26, 2021, with English Translation of same, China National Intellectual Property Adm., Bejing, China.

*Primary Examiner* — Tan Le
(74) *Attorney, Agent, or Firm* — Frost Brown Todd LLP; Alexander J. Johnson (57) ABSTRACT

The invention discloses a support member, comprising an annular body and a support projection disposed on an end surface and/or an inner wall of the annular body, wherein the support projection extends from the end surface of the annular body in an axial direction of the annular body and is configured to extend into an interior of a pipe member to support the pipe member. The pipe member is supported so that the pipe member is prevented from deformation under the action of a fastener, and effective and reliable abutting of the adjacent pipe members located on two sides of the support member is ensured, thereby improving the sealing performance and waterproofing performance at the abutment of the adjacent pipe members to enable a line pipe system formed by the pipe member to be more safe and reliable.

14 Claims, 5 Drawing Sheets

(51) Int. Cl.
*F16L 59/18* (2006.01)
*H02G 3/06* (2006.01)
*F16L 21/00* (2006.01)
*H01B 1/02* (2006.01)

(52) U.S. Cl.
CPC .............. *F16L 59/18* (2013.01); *H01B 1/023* (2013.01); *H02G 3/06* (2013.01)

(58) Field of Classification Search
CPC .......... F16B 7/0413; F16B 7/04; H01B 1/023; H02G 3/0608; H02G 3/0406
See application file for complete search history.

(56) References Cited

FOREIGN PATENT DOCUMENTS

| | | | | |
|---|---|---|---|---|
| CN | 206806914 U | 12/2017 | | |
| CN | 208011107 U | 10/2018 | | |
| CN | 209705477 U | 11/2019 | | |
| CN | 11609230 A | 9/2020 | | |
| CN | 112909591 A | 6/2021 | | |
| GB | 2110784 A | * 6/1983 | .............. | F16L 31/00 |
| GB | 2285665 A | * 7/1995 | ............ | F16L 55/105 |
| JP | 08145265 A | 6/1996 | | |
| JP | 10019177 A | * 1/1998 | | |
| JP | 2009047190 A | * 3/2009 | .............. | F16L 31/00 |

* cited by examiner

SUPPORT MEMBER AND PIPE MEMBER CONNECTING STRUCTURE

TECHNICAL FIELD

The present invention relates to the technical field of pipe member connection, in particular, to a support member and a pipe member connecting structure.

BACKGROUND

In recent years, due to the need for national economic development, large-scale engineering construction projects are quite common, and various large-scale projects such as subway construction, new airport construction as well as airport reconstruction and expansion, convention and exhibition centers, museums and large intelligent buildings emerge one after another. In these construction projects, the strong and weak power systems are complex, so that a large number of power wiring operations are required, demanding a great quantity of line pipes. A longer pipe is formed by splicing a plurality of line pipes in a line pipe arrangement course. In the prior art, the connection between two adjacent sections of line pipes is achieved primarily by means of a fastener or a clamp, which results in poor sealing performance and incapability of effective waterproofing. At the same time, the fastener or clamp clasps the line pipes at the abutment of the two adjacent sections of line pipes, thereby easily deforming the line pipes to result in an ineffective abutment of the two adjacent sections of line pipes.

For example, a Chinese utility model, with a Publication Number CN208651878U and entitled "a pipe member connecting structure and a pipeline", discloses a pipe member connecting structure including: a first pipe member including a first connection end; a second pipe member including a second connection end that is provided with a first notch including a first side surface and a second side surface opposite to the first side surface, wherein the first connection end is inserted into the second connection end; and a first fastener disposed at the second connection end. The pipeline includes the above pipe member connecting structure. When the above pipe member connecting structure is installed, the first pipe member and the second pipe member are fixedly connected by inserting the first connection end of the first pipe member into the second connection end of the second pipe member to enable mutual communication between the first pipe member and the second pipe member, and then tightening the first side surface and the second side surface of the first notch by means of the first fastener. Deformation occurs at the abutment of the first pipe member and the second pipe member in the tightening process of the first fastener to produce a gap, resulting in ineffective abutment between the pipe members, and poor sealing performance and waterproofing performance.

Therefore, an urgent problem to be solved in the art is to provide a pipe member connecting structure that supports the pipe member and prevents the pipe member from deformation.

SUMMARY

The present invention aims to solve the problems in the prior art of deformation of the pipe member due to the fastening action of the fastener in the pipe member abutting process.

In order to solve the above problems, the present invention discloses a support member comprising an annular body and a support projection disposed on an end surface and/or an inner wall of the annular body, wherein the support projection extends from the end surface of the annular body in an axial direction of the annular body and is configured to extend into an interior of a pipe member to support the pipe member.

Due to use of the above technical solution, the pipe member is supported and sealed by using the support member formed by the annular body and the support projection after the pipe member being abutted, so that the pipe member is prevented from deformation under the action of a fastener, and effective and reliable abutting of the adjacent pipe members located on two sides of the support member is ensured, thereby improving the sealing performance and waterproofing performance at the abutment of the adjacent pipe members to enable a line pipe system formed by the pipe member to be more safe and reliable.

According to another specific embodiment of the present invention, an end part and/or an outer wall of the annular body are/is provided with a flange that extends in the axial direction of the annular body and is configured to be nested to an outer wall of an end part of the pipe member.

According to another specific embodiment of the present invention, the support projection is distributed uniformly in a circumferential direction of the annular body.

According to another specific embodiment of the present invention, a cross section of the annular body is in any one of a circular annulus, an elliptical annulus, a polygonal annulus or an irregular annulus formed by curves, formed by a curve and a straight line, or formed by straight lines.

According to another specific embodiment of the present invention, the support projection is in a sheet-like structure provided on the inner wall of the annular body, and two sides of the support projection extend from the end surface of the annular body in the axial direction of the annular body.

According to another specific embodiment of the present invention, a surface of the support projection facing an inner side of the annular body is a convex surface, and a side surface of the support projection away from the annular body is convex towards a direction away from the annular body in the axial direction of the annular body.

According to another specific embodiment of the present invention, the annular body and the support projection are integrally formed from an aluminum alloy material, and the annular body and/or the support projection have/has electrical conductivity.

The present invention also discloses a pipe member connecting structure, comprising a hoop and the support member according to any one of the above embodiments. The hoop is configured to clasp the pipe members located on the two sides of the support member at the abutment of the pipe members. The support member is located at the inside of the hoop and is abutted with the pipe members on the two sides of the support member. A sealing ring is disposed between the hoop and the support member.

According to another specific embodiment of the present invention, the hoop comprises at least two hoop sections, a connecting part is disposed at an end part of each hoop section, and the hoop sections are connected in sequence by the connecting part to form the complete hoop.

According to another specific embodiment of the present invention, an anti-dumbing part is disposed on the connecting part of each hoop section. The connecting part at one end of the hoop section is provided with a recess, and the connecting part at the other end of the hoop section is provided with a protrusion. The protrusion on the hoop section is buckled with the recess on the adjacent hoop section; or connecting parts at the two ends of the hoop section are both provided with recesses, and the connecting parts at the two ends of the adjacent hoop section are both provided with protrusions. The protrusions on the hoop section are buckled with the recesses on the adjacent hoop section.

BRIEF DESCRIPTION OF THE DRAWINGS

The present invention will now be further described in detail with reference to drawings and specific embodiments.

DETAILED DESCRIPTION

Implementation modes of the present invention are described below with specific embodiments, and those skilled in the art can easily learn other advantages and effects of the present invention according to the content disclosed in the specification. Although the description of the present invention will be introduced in conjunction with preferred embodiments, this does not indicate that the features of the present invention are only limited to the embodiments. On the contrary, the description of the present invention in conjunction with the implementation modes is intended to cover other alternatives or modifications that may be derived based on the claims of the present invention. In order to thoroughly understand the present invention, the following description will contain many specific details. The present invention may also be implemented without these details. In addition, some specific details will be omitted from the description in order to avoid confusing or obscuring the key points of the present invention. It should be noted that the embodiments of the present invention and the features in the embodiments can be combined with each other without conflict.

In the description of the embodiments, it should be noted that, the terms "upper", "lower", "inner", "bottom" and the like indicate an orientation or positional relationship based on the orientation or positional relationship shown in the drawings, or the orientation or positional relationship in which a product of the present invention is conventionally placed when in use, are merely for facilitating the description of the present invention and simplifying the description, rather than indicating or implying that the device or element being referred to must have a particular orientation, be constructed and operate in a particular orientation, and therefore cannot be construed as limiting the present invention.

The terms "first," "second," and the like are used only to distinguish descriptions and are not to be understood to indicate or imply relative importance.

In the description of the embodiments, it should also be noted that the terms "provide", "arrange", "connect" and "link" are to be understood broadly unless definitely specified and limited otherwise, for example, it may be a fixed connection, a detachable connection, or an integral connection; it may be a mechanical connection or an electrical connection; it may be a direct connection or an indirect connection through an intermediate medium, and it may be a communication between two elements. Those of ordinary skill in the art may understand the specific meanings of the above terms in the embodiments according to specific situations.

Figure 1:
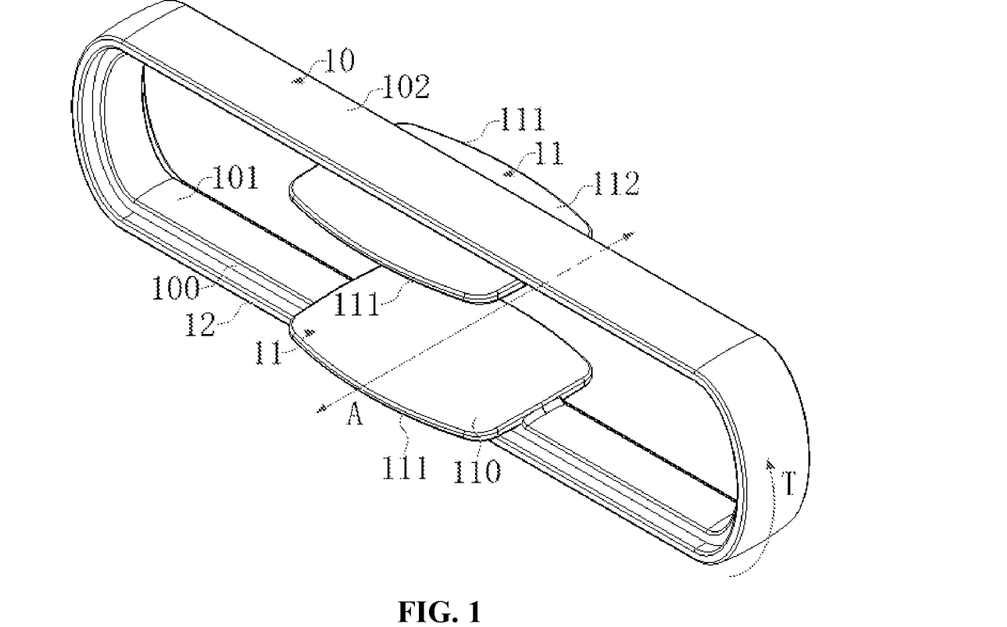
FIG. 1 is a stereostructure diagram of a support member provided by the present invention.
Figure 2:
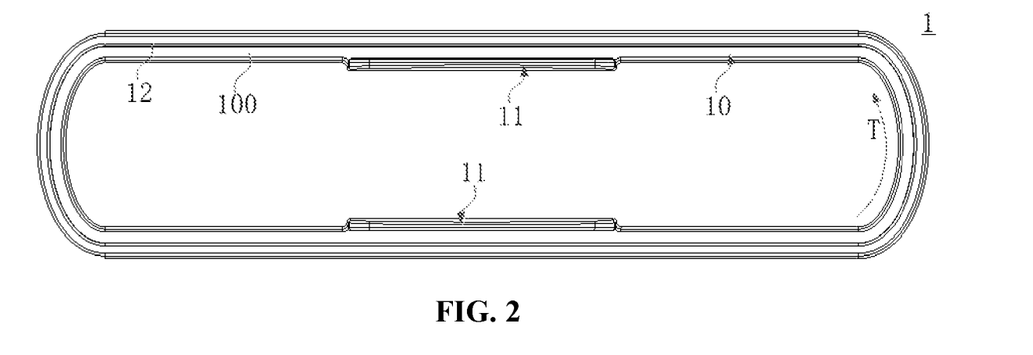
FIG. 2 is a side view of a support member provided by the present invention.
Figure 3:
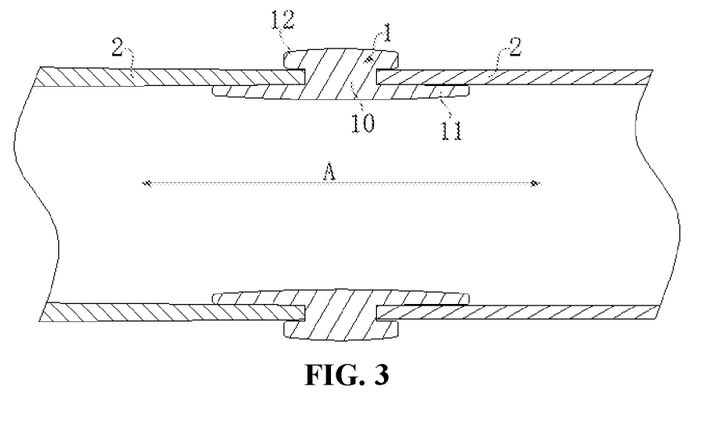
FIG. 3 is a longitudinal section view of abutted a support member and a pipe member provided by the present invention.

As shown in FIGS. 1 to 3, the present invention discloses a support member 1, comprising an annular body 10 and a support projection 11 disposed on an end surface 100 and/or an inner wall 101 of the annular body 10. The support projection 11 extends from the end surface 100 of the annular body 10 in an axial direction of the annular body 10 (as shown in a direction A in FIGS. 1 and 3) and is configured to extend into an interior of a pipe member 2 to support the pipe member 2.

That is, the support member 1 is mainly formed by the annular body 10 and the support projection 11. The support projection 11 extends in the axial direction of the annular body 10. The support projection 11 may be disposed on the end surface 100 of the annular body 10, or may be disposed on the inner wall 101 of the annular body 10, or may be partially disposed on the end surface 100 of the annular body 10 and partially disposed on the inner wall 101 of the annular body 10 as long as the support projection 11 extends from the end surface 100 of the annular body 10 and extends into the interior of the pipe member 2 to support the pipe member 2.

Specifically, referring to FIG. 1 in combination with FIG. 3, in the embodiment, the support projection 11 may extend from end surfaces 100 at two sides of the annular body 10. In the abutting process of pipe members 2, the pipe members 2 are located on the two sides of the support member 1 and the support member 1 nears end parts of the pipe members 2. The extended support projection 11 may insert into interiors of the pipe members 2, and an upper side surface 112 of the support projection 11 may be attached to an inner wall of the pipe members 2 to support and seal the pipe members 2, thereby preventing the pipe members 2 from deformation by the action of fasteners and ensuring effective and reliable abutting of the adjacent pipe members 2 located on the two sides of the support member 1.

Due to use of the above technical solution, the pipe members 2 are supported and sealed by using the support member 1 formed by the annular body 10 and the support projection 11 after the pipe members 2 are abutted, preventing the pipe members 2 from deformation under the action of the fasteners, ensuring that the adjacent pipe members 2 located on the two sides of the support member 1 can be abutted efficiently and reliably, thereby improving the sealing performance and waterproofing performance at the abutment of the adjacent pipe members 2 to enable a line pipe system connected by the pipe members 2 to be more safe and reliable.

It should be noted that the specific shape of the annular body 10 is not limited in the present invention and may be specifically configured according to the shape of the pipe member 2 as long as the support member 1 can be effectively abutted with the pipe member 2 to support the pipe member 2. Specifically, a cross section of the annular body 10 in the present invention is in any one of a circular annulus, an elliptical annulus, a polygonal annulus or an irregular annulus formed by curves, formed by a curve and a straight line, or formed by straight lines.

Referring to FIGS. 1-3, in the embodiment, an end part and/or an outer wall 102 of the annular body 10 are/is provided with a flange 12. The flange 12 extends in the axial direction of the annular body 10 and is configured to be nested to an outer wall of an end part of the pipe member 2. That is, the annular body 10 is further provided with the flange 12, and the flange 12 extends in the axial direction of the annular body 10 and may be disposed on the end part of the annular body 10, i.e., a root part of the flange 12 is disposed on the end surface 100 of the annular body 10 and extends from the end surface 100 of the annular body 10 towards a direction away from the end surface 100. At this point, an outer side surface of the flange 12 may be smoothly abutted with the outer wall 102 of the annular body 10 to form an entire side surface. At the same time, the flange 12 may also be disposed on the outer wall 102 of the annular body 10, that is, the root part of the flange 12 is attached to the outer wall 102 of the annular body 10.

Specifically, referring to FIG. 3 in combination with FIG. 1, in the embodiment, the flange 12 forms a complete circumference around a circumferential direction of the annular body 10 (as shown in a direction T in FIGS. 1 and 2). The flange 12 may be nested to the end part of the pipe member 2 and is attached to the outer wall of the pipe member 2 when abutting with the end part of the pipe member 2 to seal the junction of the pipe members 2 from the outside, which achieves a double seal in combination with sealing of the junction of the pipe members 2 by the support projection 11, thereby improving the sealing effect at the junction of the pipe members 2. At the same time, it is also possible to add a sealing material (such as unsintered tape, rubber sealing strip or sealant) between the inner wall of the flange 12 and the outer wall of the pipe member 2, between the end surface of the annular body 10 and the end part of the pipe member 2, and between the upper side surface 112 of the support projection 11 and the inner wall of the pipe member 2, such that the support member 1 and the pipe member 2 may be better sealed.

In other embodiments, the flange 12 may be disposed intermittently in the circumferential direction of the annular body 10, which is not limited in the present invention, and it may be disposed appropriately according to actual needs as long as it is ensured that the flange 12 of the support member 1 is nested to the end part of the pipe member 2.

It should be noted that the specific number and distribution of the support projection 11 are not limited in the present invention and may be specifically configured according to the shape and size of the annular body 10 as long as the support projection 11 on the support member 1 can be effectively abutted with the pipe member 2 to support the pipe member 2.

Specifically, referring to FIGS. 1-3, in the embodiment, support projections 11 are distributed uniformly in the circumferential direction of the annular body 10. That is, a plurality of the support projections 11 are distributed uniformly on the annular body 10 along the circumferential direction of the annular body 10. The plurality of the support projections 11 distributed uniformly extend into interiors of the pipe members 2 when abutting with end parts of the pipe members 2 to be attached to inner walls of the pipe members 2 so as to perform multi-point support on the pipe members 2, such that the pipe members 2 may be subjected to more uniform force, thereby preventing the pipe members 2 from deformation by fasteners, and ensuring effective and reliable abutting of the adjacent pipe members 2 located on the two sides of the support member 1.

More specifically, referring to FIGS. 1-3, in the embodiment, two support projections 11 are symmetrically disposed on the annular body 10. The support projections 11 are in a sheet-like structure provided on inner walls 101 of the annular body 10, and two sides of each support projection 11 extend from the end surface 100 of the annular body 10 in the axial direction of the annular body 10.

That is, the two support projections 11 are symmetrically disposed on the inner walls 101 of upper and lower sides of the annular body 10, and upper side surfaces 112 of the support projections 11 are in fixed and attached connection with the inner walls 101 of the annular body 10. The support projections 11 are each in a sheet-like structure, and the two sides of each support projection 11 symmetrically extend from the two end surfaces 100 of the annular body 10 in the axial direction of the annular body 10. The support projections 11 extend into the interiors of pipe members 2 when abutting with the pipe members 2. The end surfaces 100 of the annular body 10 are abutted with the end surfaces of the pipe members 2, and the upper side surfaces 112 of the support projections 11 in the sheet-like structure may be attached to the inner walls of the pipe members 2, with a large abutting area, so that the pipe members 2 may be effectively and reliably supported, preventing the pipe members 2 from deformation.

Referring to FIG. 1 in combination with FIG. 3, in the embodiment, a surface of the support projection 11 facing an inner side of the annular body 10 is a convex surface 110. The cross section of the support projection 11 may be gradually thickened from an end remote from the annular body 10 to the end surface 100 of the annular body 10 by setting the surface of the support projection 11 facing the inner side of the annular body 10 as the convex surface 110, so as to improve the strength of the support projection 11. Meanwhile, the convex surface 110 may further disperse the force applied to the support projection 11 by the inner wall of the pipe member 2, ensuring that the convex surface 110 may stably and effectively support the pipe member 2 from the inside.

Preferably, the convex surface 110 is an arc-shaped convex surface that is smooth and does not scratch a line passing through the pipe member 2 and the support member 1. In other embodiments, the convex surface may also be a trapezoidal convex surface, and may be other types of convex surfaces, which is not limited in the present invention, and may be appropriately disposed according to actual needs as long as the strength of the support projection may be ensured.

In addition, referring to FIG. 1 in combination with FIG. 3, in the embodiment, a side surface 111 of the support projection 11 away from the annular body 10 is convex towards a direction away from the annular body 10 in the axial direction of the annular body 10, so as to form a convex surface. The side surface 111 of the support projection 11 away from the annular body 10 is provided with the convex surface towards the direction away from the annular body 10, so that when the support projection 11 abuts with the pipe member 2, the foremost end of the convex surface is the first to contact the inner wall of the pipe member 2. A contact surface between the support projection 11 and the inner wall of the pipe member 2 is increasingly wider as the support projection 11 continues to be inserted until the contact surface occupies the entire width of the support projection 11, so that the convex surface has the effect of guiding the abutment between the support projection and the pipe member 2 to facilitate the insertion of the support projection 11 into the pipe member 2, i.e., to facilitate the installation of the support member 1.

Preferably, the side surface 111 of the support projection 11 away from the annular body 10 is an arc-shaped convex surface and the arc-shaped convex surface can guide the support projection 11 to be smoothly inserted into the pipe member 2. In other embodiments, the side surface 111 of the support projection 11 away from the annular body 10 may be a trapezoidal convex surface, or may be other types of convex surfaces, which is not limited in the present invention, and may be appropriately disposed according to actual needs as long as the support projection 11 may be guided to be inserted into the pipe member 2.

Further, in other embodiments, the number and specific shape of the support projection 11 may be specifically configured according to the shape and size of the annular body 10. For example, the support projection 11 may be formed in a complete circumferential shape along the circumferential direction of the annular body 10, which is not limited in the present invention as long as the support projection 11 on the support member 1 may be effectively abutted with the pipe member 2 to support the pipe member 2.

In the embodiment, the annular body 10 and the support projection 11 are integrally formed from an aluminum alloy material, and the annular body 10 and/or the support projection 11 have/has electrical conductivity. That is, the annular body 10 and the support projection 11 are both made from an aluminum alloy material, and both are machined an entirety by integrally molding. Therefore, the annular body 10 and the support projection 11 both have electrical conductivity and can communicate the pipe member 2 on both sides of the support member 1, so that an entire pipeline spliced by the pipe member 2 acts as a grounding line of a power system, and there is no need to separately dispose a grounding terminal and a grounding line in the pipeline, thereby simplifying the structure of the pipeline. It is also possible to conduct electricity only through the support projection 11, and it is also possible to conduct electricity through the annular body 10 itself when support projections 11 at the two ends of the annular body 10 are connected as a whole, which is not limited in the present invention and may be appropriately selected and disposed according to actual needs.

Figure 4:
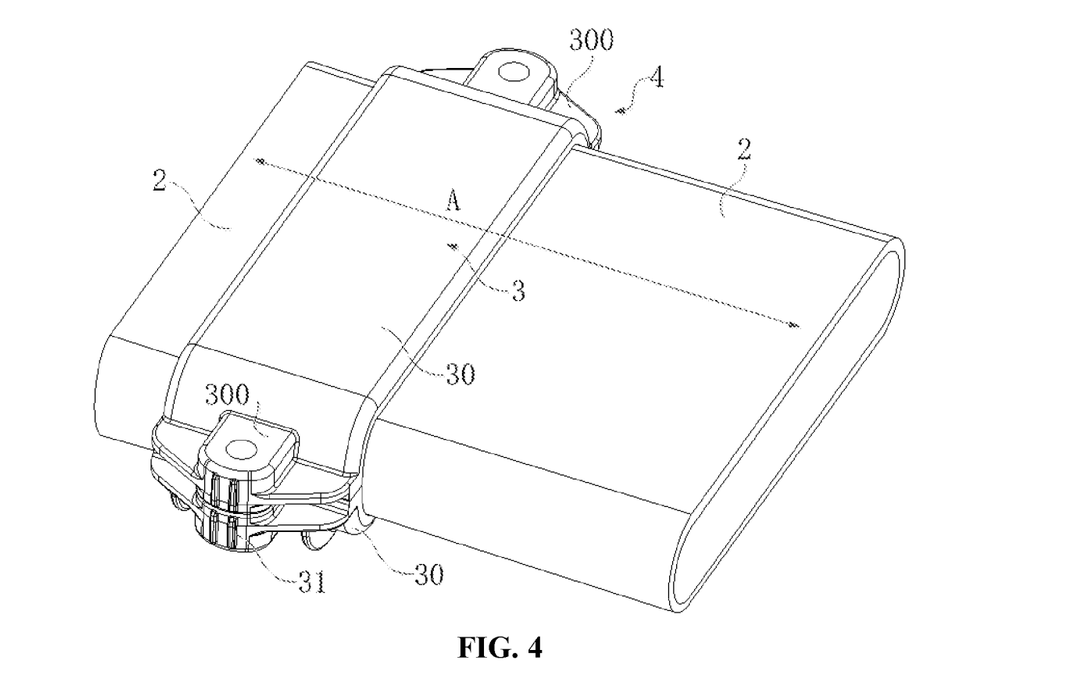
FIG. 4 is a stereostructure diagram of abutted a pipe member connecting structure and a pipe member provided by the present invention.
Figure 5:
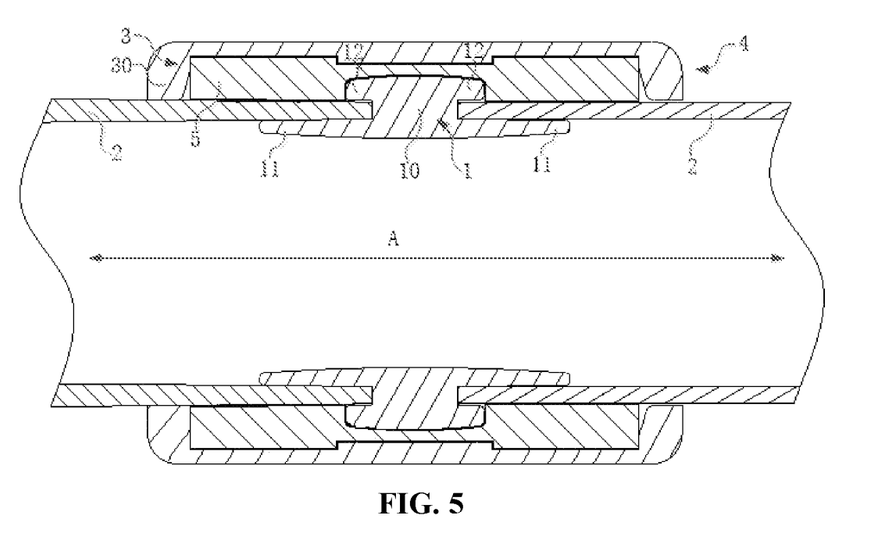
FIG. 5 is a longitudinal section view of abutted a pipe member connecting structure and a pipe member provided by the present invention.
Figure 6:
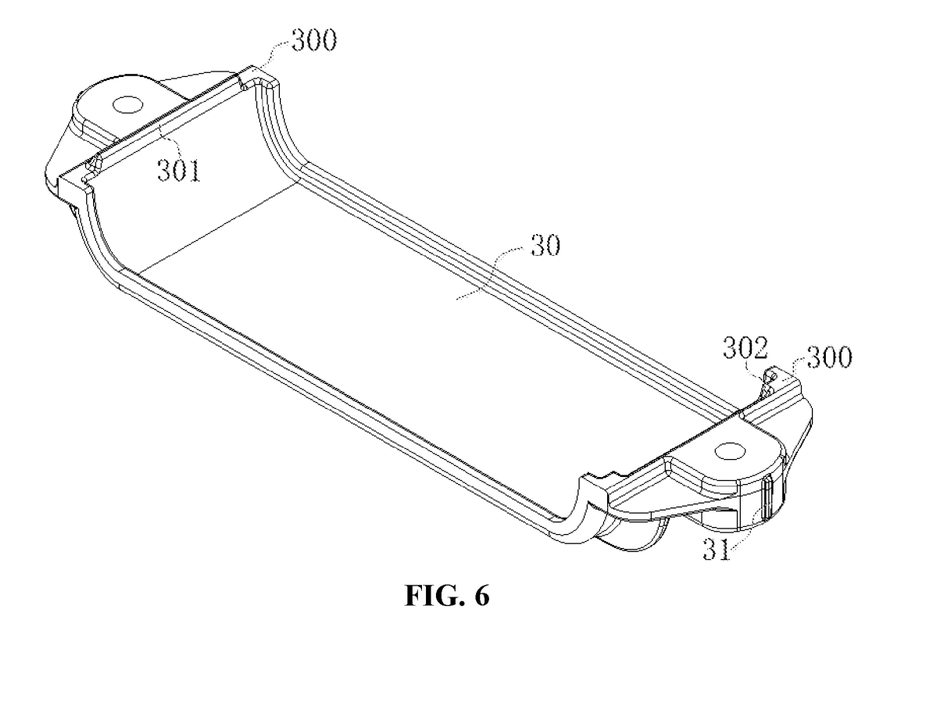
FIG. 6 is a stereostructure diagram of a hoop section in a pipe member connecting structure provided by the present invention.

As shown in FIGS. 4-6, the present invention also discloses a pipe member connecting structure 4, comprising a hoop 3 and the support member 1 according to any one of the above embodiments. The hoop 3 is configured to clasp pipe members 2 located on two sides of the support member 1 at the abutment of the pipe members 2. The support member 1 is located at the inside of the hoop 3 and is abutted with the pipe members 2 on the two sides of the support member 1. A sealing ring 5 is disposed between the hoop 3 and the support member 1.

That is, the pipe member connecting structure 4 is mainly formed by the hoop 3, the support member 1 and the sealing ring 5, wherein the support member 1 is located at an innermost part, and the support projections 11 of the support member 1 may extend into the pipe members 2 located on the two sides of the support member 1 in the axial direction of the annular body 10 (as shown in a direction A in FIGS. 4 and 5), and the support projections 11 are attached to the inner walls of the pipe members 2 to support the pipe members 2 from the inside. After abutting the support member 1 with the pipe members 2 on both sides is completed, the sealing ring 5 is nested at the abutment of the pipe members 2, such that the sealing ring 5 completely covers flanges 12 and outer walls 102 of the support member 1, thereby sealing the junction of the pipe members 2. Afterwards, the hoop 3 is installed on the outside of the sealing ring 5 so that the hoop 3 completely covers the sealing ring 5, and the pipe members 2 are effectively and reliably abutted and sealed by clasping the pipe members 2 located on the two sides of the support member 1 and pressing the sealing ring 5 via the hoop 3. The pipe member connecting structure 4 can support the pipe members 2 from the inside by the support member 1, preventing the hoop 3 from compressing and deforming the pipe members 2. At the same time, effective abutment and reliable sealing at the junction of the pipe members 2 may be achieved by combining the hoop 3 with the support member 1 and the sealing ring 5, thereby improving the waterproofing performance of the entire pipeline.

Referring to FIGS. 4-6, in the embodiment, the hoop 3 comprises at least two hoop sections 30, connecting parts 300 are disposed at end parts of the hoop sections 30, and the hoop sections 30 are connected in sequence by the connecting parts 300 to form the complete hoop 3. That is, the hoop 3 is formed by a plurality of hoop sections 30 in sequence. The number and specific structure of the hoop sections are not limited in the present invention, and may be appropriately selected according to the shape, structure and size of the pipe member 2 as long as the hoop may clasp the sealing ring and the junction of the pipe member 2.

Specifically, referring to FIGS. 4-6, in the embodiment, the hoop 3 is formed by connecting two hoop sections 30. And two ends of each hoop section 30 are provided with connecting parts 300 by which the two hoop sections 30 are connected to each other to form the complete hoop 3. In the embodiment, the connecting parts 300 of the hoop sections 30 are a lug structure. When the two hoop sections 30 are clamped to each other, the corresponding connecting parts 300 can be abutted, and then the abutted connecting parts 300 are locked by fasteners (e.g., bolts, screws, pins, rivets, etc.), such that the two hoop sections 30 form the complete hoop 3 encircling the sealing ring. At the same time, the strength with which the hoop 3 clasps the junction of the pipe members 2 may be adjusted by adjustment of the fasteners, thereby facilitating use.

In addition, in order to facilitate the abutment and buckling of the abutted connecting parts 300 of the adjacent hoop sections 30, as shown in FIG. 6, in the embodiment, the connecting part 300 at one end of each hoop section 30 is provided with a recess 302 and the connecting part 300 at the other end of each hoop section 30 is provided with a protrusion 301. The protrusion 301 on each hoop section 30 is buckled with the recess 302 on the adjacent hoop section 30. An anti-dumbing part 31 is disposed on the connecting part 300 of each hoop section 30. That is, the connecting part 300 provided with the recess 302 on the hoop section 30 may be only abutted and buckled with the connecting part 300 provided with the protrusion 301 on the adjacent hoop section 30 by providing the protrusion 301 and recess 302 on the connecting parts 300 at the two ends of each hoop section 30 respectively. Meanwhile, in combination with the anti-dumbing part 31 disposed on each connecting part 300, the hoop sections 30 are prevented from being connected wrongly, and the hoop sections 30 can be sequentially and orderly connected.

In another embodiment of the present invention, connecting parts at the two ends of the hoop section are both provided with recesses, and the connecting parts at the two ends of the adjacent hoop section are both provided with protrusions. The protrusions on the hoop section are buckled with the recesses on the adjacent hoop section. That is, the recesses are provided at the connecting parts at the two ends of the same hoop section, and the protrusions are provided at the two ends of the adjacent hoop section. The hoop section provided with the protrusions and the hoop section provided with the recesses are sequentially and orderly connected along the circumferential direction of the pipe member to form a complete hoop. In other embodiments, the form and specific number of the protrusion and the recess may be appropriately disposed and selected according to actual needs, which are not limited in the present invention as long as the adjacent hoop sections may be effectively buckled and connected.

Referring to FIG. 6 in combination with FIG. 4, in the embodiment, the anti-dumbing part 31 disposed on the connecting part 300 is a convex stripe. Specifically, two vertical convex stripes are disposed on an outer side of the connecting part 300 with the protrusion 301 and one vertical convex stripe is disposed on the outer side of the connecting part 300 with the recess 302. By identifying the number of the convex stripe, it is possible to easily identify the ends, at which the protrusion 301 and the recess 302 on the connecting part 300 are respectively located, of the hoop section 30, so as to facilitate installation and use of the hoop section 30. In other embodiments, the anti-dumbing part may also be other structures, such as different numbers of bumps, different shapes of patterns and other forms, which are not limited in the present invention, and may be appropriately disposed according to actual needs.

In summary, due to use of the technical solution provided by the present application, the pipe member is supported and sealed by using the support member formed by the annular body and the support projection after the pipe member being abutted, so that the pipe member is prevented from deformation under the action of the fasteners, and effective and reliable abutting of the adjacent pipe members located on the two sides of the support member is ensured, thereby improving the sealing performance and waterproofing performance at the abutment of the adjacent pipe members to enable a line pipe system formed by the pipe member to be more safe and reliable.

It should also be noted that the specific structure, type and use of each pipe member in the above embodiments are not limited in the present invention, and may be appropriately selected according to actual needs as long as the pipe member may be abutted with the support member and the pipe member connecting structure formed by the support member, the hoop and the sealing ring. Preferably, referring to FIGS. 7-9, the pipe member 2 is a line pipe 6 applied to pipeline arrangement of a power system.

Figure 7:
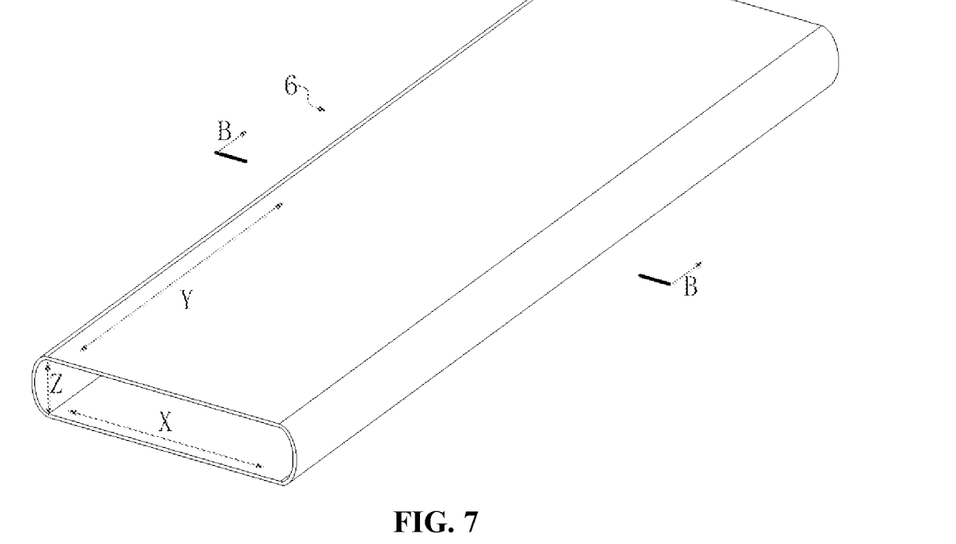
FIG. 7 is a stereostructure diagram of a line pipe provided by the present invention.
Figure 8:
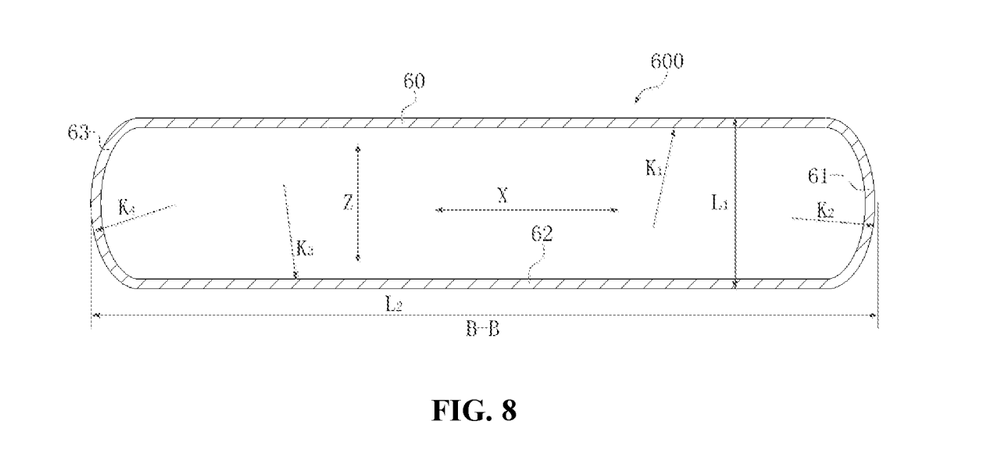
FIG. 8 is a cross section view of a line pipe provided by the present invention.
Figure 9:
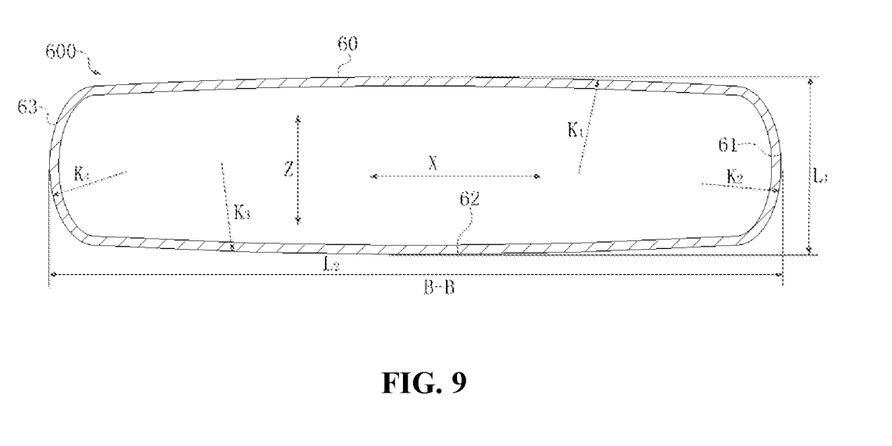
FIG. 9 is a cross section view of a line pipe according to another embodiment provided by the present invention.

Specifically, referring to FIGS. 7-9, a cross section of the line pipe 6 includes a closed profile 600 formed by a first side edge 60, a second side edge 61, a third side edge 62 and a fourth side edge 63 which are smoothly connected in sequence, wherein the first side edge 60 and the third side edge 62 are oppositely disposed in a first direction (as shown in a Z direction in FIGS. 7-9), and the second side edge 61 and the fourth side edge 63 are oppositely disposed in a second direction (as shown in an X direction in FIGS. 7-9). The first direction and the second direction are perpendicular to each other. The second side edge 61 and the fourth side edge 63 are curves that protrude towards the outside of the profile 600.

That is, the profile 600 of the cross section of the line pipe 6 is mainly composed of the first side edge 60, the second side edge 61, the third side edge 62 and the fourth side edge 63 which may be connected by nodes or by connecting sections. Specifically, in the embodiment, the profile 600 is a closed polygon formed by connecting the side edges smoothly in sequence. That is, the side edges are connected in sequence by smooth connecting segments. "Smooth" herein refers to smoothness and evenness, which avoids the formation of folded corners between the side edges, and well disperses a resultant force formed by gravity and stress of concrete, thereby improving the strength of the line pipe 6. At the same time, the side edges of the profile 600 are also smooth to facilitate the distribution of forces.

Specifically, referring to FIGS. 7-9, in the embodiment, the first side edge 60 and the third side edge 62 are oppositely disposed in the first direction, and the second side edge 61 and the fourth side edge 63 are oppositely disposed in the second direction. The first direction is a thickness direction of the line pipe 6, i.e., a height direction of the line pipe 6. The second direction is a width direction of the line pipe 6. The first direction and the second direction are perpendicular to each other. That is, the first side edge 60 and the third side edge 62 are an upper side edge and a lower side edge of the line pipe 6 respectively, and the second side edge 61 and the fourth side edge 63 are a right-side edge and a left side edge of the line pipe 6 respectively.

In other embodiments, the first direction and the second direction may be set according to the specific structure of the line pipe, which are not limited in present invention, and may be appropriately selected according to actual needs. For example, the first direction and the second direction may be set at a certain angle as long as the side edges of the line pipe are disposed oppositely and are distinguished conveniently.

Referring to FIGS. 7-9, in the embodiment, the second side edge 61 and the fourth side edge 63 of the line pipe 6 are curves that protrude towards outside of the profile 600. That is, the second side edge 61 and the fourth side edge 63 of the line pipe 6 protrude towards the outside in the second direction, such that the second side edge 61 and the fourth side edge 63 form a curve shape. The second side edge 61 and the fourth side edge 63 are smoothly connected to the first side edge 60 and the third side edge 62, respectively, in sequence.

When the first side edge 60 of the line pipe 6 is subjected to the resultant force formed by the gravity and stress of the concrete, the first side edge 60 can transmit the borne force to the second side edge 61 and the fourth side edge 63 in the curve shape through the smooth connecting segments, and the force applied to the first side edge 60 by the concrete may be well dispersed. In addition, since the second side edge 61 and the fourth side edge 63 are in the curve shape separately, the second side edge 61 and the fourth side edge 63 are also subjected to an extrusion force applied by the concrete on the two sides of the line pipe 6 while they are bearing the force transmitted from the first side edge 60. At the same time, since the second side edge 61 and the fourth side edge 63 protrude towards the outside of the profile 600, the extrusion force is towards the inside of the profile 600. The extrusion force can support the second side edge 61 and the fourth side edge 63 in a radial direction of the second side 61 and the fourth side 63, so as to resist the force transmitted from the first side edge 60, such that the whole profile 600 of the line pipe 6 remain stable to avoid deformation, and eliminate the potential risk of a possible gap between the line pipes 6, thereby effectively achieving the effects of waterproofing and preventing the leakage of concrete, improving the waterproof performance and strength of the line pipes 6, and ensuring the safe and reliable pipeline system in which the all line pipes 6 are arranged.

Due to the use of the above technical solution, by smoothly connecting the side edges of the line pipe in sequence, and designing the second side edge 61 and the fourth side edge 63 to be separately in the curve shape that protrudes towards the outside of the profile, the resultant force applied by the concrete can not only be well dispersed and borne, and the strength and waterproofing performance of the line pipe are improved, such that the line pipe 6 is safer and more reliable. Moreover, designing the second side edge 61 and the fourth side edge 63 to be separately in the curve shape can make the pipeline better be attached to the second side edge 61 and the fourth side edge 63, so that the space utilization inside the line pipe 6 is increased.

It should be noted that the specific shapes of the first side edge and the third side edge are not limited in the present invention and may be appropriately selected according to actual needs as long as the strength of the line pipe, the waterproofing performance and the space utilization inside the line pipe can be ensured.

Specifically, referring to FIGS. 7-8, in the embodiment, the first side edge 60 and the third side edge 62 are straight lines. By setting the first side edge 60 and the third side edge 62 as straight lines not only makes the line pipe 6 structurally simpler and facilitates the production, transportation and installation while ensuring sufficient strength and waterproofing performance of the line pipe 6. Moreover, it is possible to ensure that the line pipe 6 has a high space utilization inside the line pipe under a certain height requirement.

Referring to FIG. 9, in another embodiment of the present invention, the first side edge 60 and the third side edge 62 are curves that protrude towards the outside of the profile 600, and the curvature K1 of the first side edge 60 and the curvature K3 of the third side edge 62 are less than 0.002, i.e., the curvature K1 at each point of the first side edge 60 and the curvature K3 at each point of the third side edge 62 are less than 0.002. Designing the first side edge 60 and the third side edge 62 to be curves that protrude towards the outside of the profile 600 not only enables a smoother connection between the side edges of the line pipe 6, better disperses and bears the force applied by the concrete and ensures that the line pipe 6 has sufficient strength and waterproofing performance, but also enlarges the space inside the line pipe 6 and improves the threading capacity and the space utilization inside the line pipe 6. In addition, limiting the curvature K1 at each point of the first side edge 60 and the curvature K3 at each point of the third side edge 62 to less than 0.002 can define the curving degrees of the first side edge 60 and the third side edge 62, ensuring that the height of the line pipe 6 remains within an effective range of use.

It should be further noted that the specific shapes of the second side edge and the fourth side edge are not limited in the present invention and may be appropriately selected according to actual needs as long as the strength of the line pipe, the waterproofing performance and the internal space utilization of the line pipe can be ensured.

Specifically, in the present invention, the second side edge 61 and the fourth side edge 63 each include any one of or a combination of a circular arc, an elliptical arc, a parabolic segment, an involute segment, a spiral segment. In the embodiment, the second side edge 61 and the fourth side edge 63 have the same shape, such that the force of the line pipe 6 is distributed symmetrically. Preferably, the second side edge 61 and the fourth side edge 63 are elliptical arcs. In other embodiments, the second side edge and the fourth side edge may have other shapes, which may be not limited in the present invention.

Further, referring to FIG. 9, in the embodiment, the curvature K2 of the second side edge 61 and the curvature K4 of the fourth side edge 63 are in the range of 0.010.05. That is, the curvature K2 at each point of the second side edge 61 and the curvature K4 at each point of the fourth side edge 63 are in the range of 0.010.05. When the curvature K2 of the second side edge 61 and the curvature K4 of the fourth side edge 63 are larger, the second side 61 and the fourth side edge 63 further protrude towards the outside of the profile 600, such that the second side edge 61 and the fourth side edge 63 are more flattened in shape, and lines cannot be efficiently arranged on the two sides of the line pipe, reducing the space utilization inside the line pipe 6. When the curvature K2 at each point of the second side edge 61 and the curvature K4 at each point of the fourth side edge 63 are smaller, the second side edge 61 and the fourth side edge 63 become more straight, and the transition between the second side edge 61, the fourth side edge 63 and the first side edge 60, the third side edge 62 is smoother, thereby failing to effectively disperse and bear the force applied by the concrete, and reducing the strength and waterproofing performance of the line pipe 6. Therefore, preferably, the curvature K2 of the second side edge 61 and the curvature K4 of the fourth side edge 63 are in the range of 0.010.05. By defining the curving degrees of the second side edge 61 and the fourth side edge 63, the line pipe 6 can effectively disperse the force applied by the concrete and can be prevented from deformation. Further, it is ensured that the line pipe 6 has higher strength and better waterproofing performance while ensuring higher space utilization inside the line pipe 6.

In practical use, there are certain limitations on the thickness of concrete to be poured and on the size of a rebar frame structure. The thickness of the concrete is generally between 80 mm and 150 mm. Therefore, certain limitations on the size of the line pipe are required to ensure that the line pipe can be completely poured within the concrete and the rebar frame structure.

Specifically, referring to FIGS. 8-9, in the embodiment, a distance L1 between the first side edge 60 and the third side edge 62 is in the range of 25 mm~45 mm, i.e., a maximum distance L1 between the first side edge 60 and the third side edge 62 is in the range of 25 mm~45 mm. A distance L2 between the second side edge 61 and the fourth side edge 63 is in the range of 50 mm~300 mm. That is, a maximum distance L2 between the second side edge 61 and the fourth side edge 63 is in the range of 50 mm~300 mm. It is possible to enable the pipe 6 to be poured completely within the concrete and the rebar frame structure by limiting the dimensions of the pipe 6, thereby avoiding the line pipe 6 from being exposed from the concrete and the rebar frame structure.

In addition, in order to maintain the higher space utilization inside the line pipe, referring to FIGS. 8-9, in the embodiment, a ratio of the distance between the first side edge 60 and the third side edge 62 to the distance between the second side edge 61 and the fourth side edge 63 is in the range of 0.1~0.7. That is, the line pipe 6 is required to conform to a certain range of ratios in the height direction and in the width direction, and preferably, this range of ratios is from 0.1 to 0.7, that is, L1/L2 is in the range of 0.1~0.7. If the ratio of the height to the width of the line pipe 6 is small, it will make the length of the first side edge 60 and the third side edge 62 excessively long, so that the ability of bearing the force of the concrete may be reduced to produce deformation easily. If the ratio of the height to the width of the line pipe 6 is large, the second side edge 61 and the fourth side edge 63 of the line pipe 6 may be excessively long in length, and the height of the pipe 6 is increased, so that it cannot be ensured that the line pipe 6 can be completely poured in the concrete, and the space utilization inside the line pipe 6 is reduced. In the embodiment, the space utilization inside the line pipe 6 may be increased under the premise of ensuring the strength of the line pipe 6 by limiting that L1/L2 is in the range of 0.1~0.7.

Referring to FIGS. 7-9, in the embodiment, the line pipe 6 is integrally formed from an aluminum alloy material. The sealing performance of the whole structure of the line pipe 6 is guaranteed, and the waterproof performance of the line pipe 6 is improved by integrally forming and processing the aluminum alloy material into the line pipe. Moreover, the aluminum alloy material may make the line pipe have a better corrosion resistance effect, and the service life of the line pipe is prolonged. Moreover, the aluminum alloy material is easy to shape and easy to process. At the same time, the aluminum alloy material is capable of conducting electricity, and can be used as a grounding line of the pipeline system, without disposing a grounding terminal and a grounding line separately in the pipeline system, thereby simplifying the structure of the pipeline system.

Although the present invention has been illustrated and described with reference to some preferred embodiments of the present invention, those of ordinary skill in the art should understand that the above content is a further detailed description of the present invention in conjunction with the specific embodiments, and it cannot be considered that the specific embodiments of the present invention are only limited thereto. Those skilled in the art may make various changes in forms and details, including several simple deductions or substitutions, without departing from the spirit and scope of the present invention.

What is claimed is:

1. A support member, characterized by comprising an annular body, and a first support projection and a second support projection disposed on an end surface and/or an inner wall of the annular body, wherein the first support projection is symmetrically disposed from the second support projection, wherein the first and second support projections each extend from the end surface of the annular body in an axial direction of the annular body, and wherein the first and second support projections are each is configured to extend into an interior of a pipe member to support the pipe member.

2. The support member according to claim 1, characterized in that an end part and/or an outer wall of the annular body are/is provided with a flange that extends in the axial direction of the annular body and are/is configured to be nested to an outer wall of an end part of the pipe member.

3. The support member according to claim 1, characterized in that a cross section of the annular body is in any one of a circular annulus, an elliptical annulus, a polygonal annulus, or an irregular annulus formed by curves, formed by a curve and a straight line, or formed by straight lines.

4. The support member according to claim 1, characterized in that the first and second support projections are in a sheet-like structure provided on the inner wall of the annular body, and two sides of the first and second support projections extend from the end surface of the annular body in the axial direction of the annular body.

5. The support member according to claim 4, characterized in that a surface of the first and second support projections facing an inner side of the annular body is a convex surface, and a side surface of the first and second support projections are away from the annular body is convex towards a direction away from the annular body in the axial direction of the annular body.

6. The support member according to claim 1, characterized in that the annular body and the first and second support projections are integrally formed from an aluminum alloy material, and the annular body and/or the first and second support projections have/has electrical conductivity.

7. A pipe member connecting structure, characterized by comprising a hoop and a support member, wherein the support member is characterized by comprising an annular body and a first support projection and as second support projection disposed on an end surface and/or an inner wall of the annular body, wherein the first support projection is symmetrically disposed from the second support projection, wherein the first and second support projections each extend from the end surface of the annular body in an axial direction of the annular body, and wherein the first and second support projections are each configured to extend into an interior of a pipe member to support the pipe member; and wherein the hoop is configured to clasp pipe members located on two sides of the support member at the abutment of the pipe members, the support member is located at the inside of the hoop and is abutted with the pipe members on the two sides of the support member, and a sealing ring is disposed between the hoop and the support member.

8. The pipe member connecting structure according to claim 7, characterized in that the hoop comprises at least two hoop sections, a connecting part is disposed at an end part of each hoop section, and the hoop sections are connected in sequence by the connecting part to form the complete hoop.

9. The pipe member connecting structure according to claim 8, characterized in that an anti-dumbing part is disposed on the connecting part of each hoop section; the connecting part at one end of the hoop section is provided with a recess, and the connecting part at the other end of the hoop section is provided with a protrusion; the protrusion on the hoop section is buckled with the recess on the adjacent hoop section; or connecting parts at the two ends of the hoop section are both provided with recesses, and the connecting parts at the two ends of the adjacent hoop section are both provided with protrusions; and the protrusions on the hoop section are buckled with the recesses on the adjacent hoop section.

10. The support member according to claim 2, characterized in that the annular body and the first and second support projections are integrally formed from an aluminum alloy material, and the annular body and/or the first and second support projections have/has electrical conductivity.

11. The support member according to claim 1, characterized in that the annular body and the first and second support projections are integrally formed from an aluminum alloy material, and the annular body and/or the first and second support projections have/has electrical conductivity.

12. The support member according to claim 3, characterized in that the annular body and the first and second support projections are integrally formed from an aluminum alloy material, and the annular body and/or the first and second support projections have/has electrical conductivity.

13. The support member according to claim 4, characterized in that the annular body and the first and second support projections are integrally formed from an aluminum alloy material, and the annular body and/or the first and second support projections have/has electrical conductivity.

14. The support member according to claim 5, characterized in that the annular body and the first and second support projections are integrally formed from an aluminum alloy material, and the annular body and/or the first and second support projections have/has electrical conductivity.

\* \* \* \* \*